UNITED STATES PATENT OFFICE.

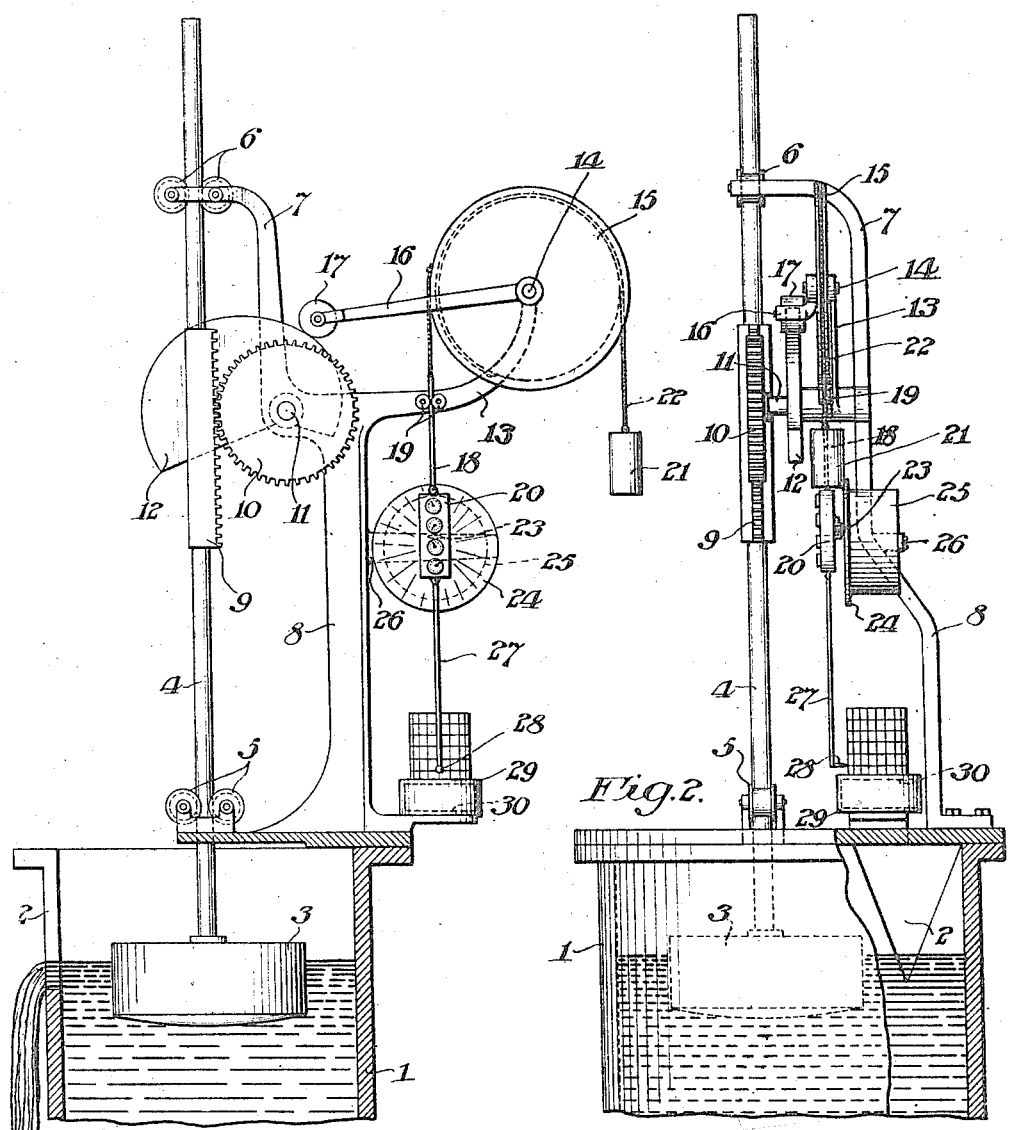

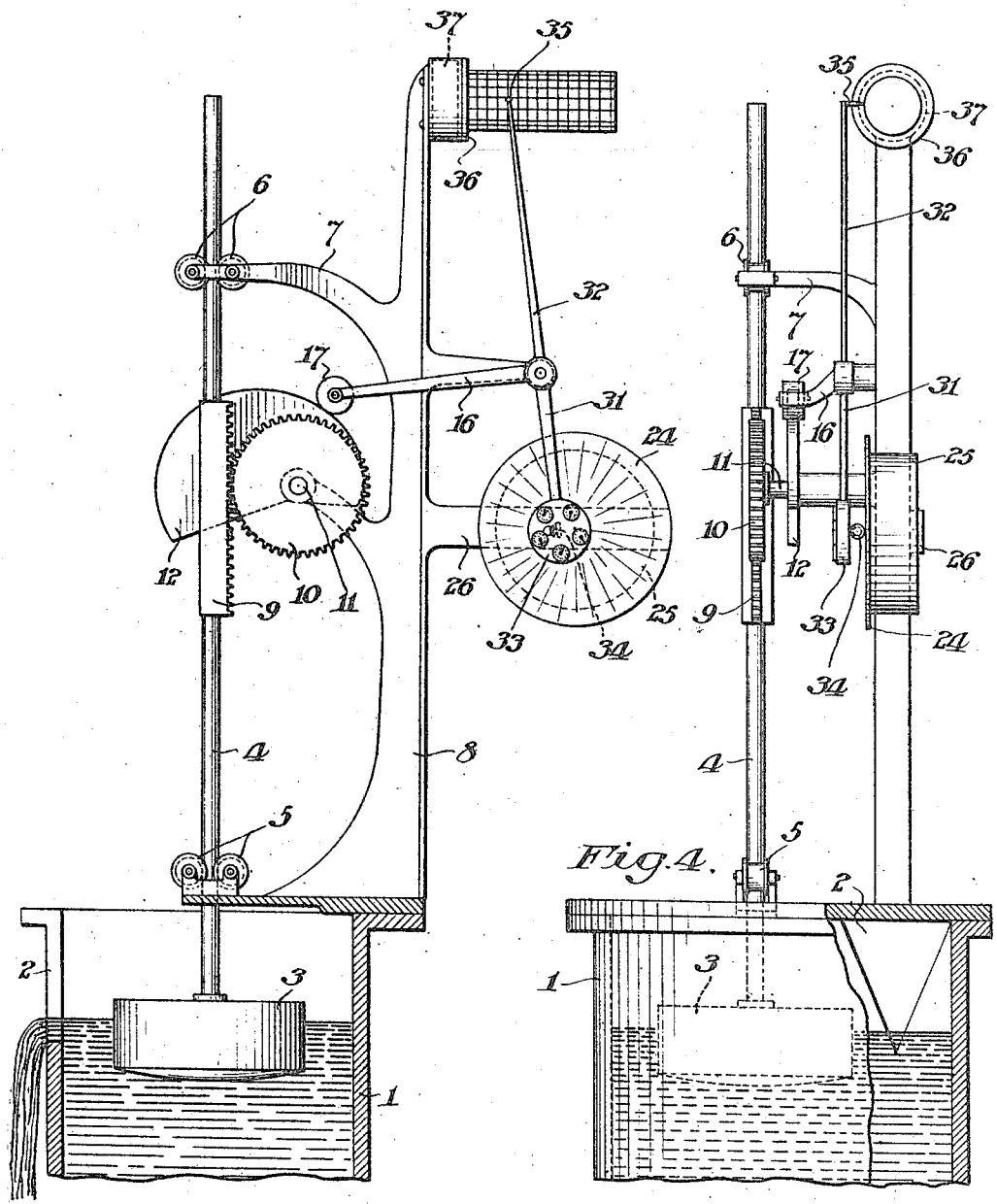

JOHN W. LEDOUX, OF SWARTHMORE, PENNSYLVANIA.

FLUID-METER.

1,268,130.

Specification of Letters Patent.

Patented June 4, 1918.

Application filed September 4, 1917. Serial No. 189,576.

*To all whom it may concern:*

Be it known that I, JOHN W. LEDOUX, a citizen of the United States, residing at Swarthmore, in the county of Delaware and State of Pennsylvania, have invented certain Improvements in Fluid-Meters, of which the following is a specification.

This invention relates to improved means for measuring the flow of fluids by effecting movements having a functional relation to variations in the head which induces the flow and it is adapted particularly for effecting an accurate measurement of the discharge of liquids through weirs from the minimum to the maximum flow by simple mechanism.

In the accompanying drawings, Figure 1 is a part sectional elevation of a construction embodying my invention; Fig. 2 is a part sectional elevation of the same taken at right angles to the view illustrated in Fig. 1; Fig. 3 is a part sectional elevation of a modified construction; and Fig. 4 is a part sectional elevation of the modified construction taken at right angles to the view illustrated in Fig. 3.

As illustrated in the drawings, a conduit 1, having a discharge notch or weir 2, contains a float 3 which rises and falls with changes in the level of the liquid in the conduit or the depth of the liquid flowing through the weir. A rod 4 is fixed to the float and extends upwardly between guide rollers, as the rollers 5 supported on top of the conduit 1 and the rollers 6 supported by an arm 7 of a standard 8. A rack 9 on the rod 4 engages a spur wheel 10 journaled by means of an arbor 11 which is carried by the standard 8, the wheel having a cam 12 fixed thereto. The float acts through the rack on the wheel to turn the cam proportionately to changes in the head or level of the liquid.

In the form of the invention illustrated in Figs. 1 and 2, an arm 13 on the standard 8 carries an arbor 14 by which is journaled a sheave 15 and a lever 16 fixed thereto, the lever being provided with a roller 17 which engages the periphery of the cam 12.

The sheave 15 has depending therefrom a hanger or tension member 18 which moves between the guide rollers 19 carried by the arm 13, the hanger carrying a register mechanism 20, which is counter-balanced by a weight 21 suspended from the periphery of the sheave by a cord 22. A traction wheel 23 of the registering mechanism makes contact with the surface of a disk 24, which is connected with and revolved at a constant rate by clock mechanism 25 carried by an arm 26 on the standard 8, the traction wheel being movable radially with relation to the disk between its center and periphery by the movement of the lever 16 under control of the cam 12.

A hanger 27, depending from the mechanism 20, carries a marker 28 which moves parallel to the axis of a cylinder 29 revolved at a constant rate by a clock 30, the marker making a record on a chart carried by the cylinder and thereby recording the positions of the float 3 and the flow of liquid which is a function thereof.

It will be understood that when the flow is at zero or the minimum, the surface of the liquid in the conduit being level with the bottom of the weir, the traction wheel is at the center of the disk and the marker is at the zero or datum line of the chart. As the surface of the liquid rises and the flow increases from zero, the float acts through the intermediate parts on the cam, which is turned through an angle proportional to the movement of the float or the increase in head inducing the flow and elevates the arm 16, the latter acting through the intermediate parts to move the traction wheel from the center of the disk and the marker from the datum line of the chart. The cam is shaped so that the movement results in such changes in the rate of operation of the registering mechanism that it will register the flow and the recording mechanism is coordinated with the cam so that the record made correctly represents the rate of flow throughout a given period of time.

As illustrated in Figs. 3 and 4, the arm 16, oscillated by the engagement of its roller 17 with the periphery of the cam 12, oscillates the arms 31 and 32, which are fixed thereto.

The arm 31 carries a registering mechanism 33 operated by the movements of its traction wheel 34 between the center and periphery of the disk 24 revolved at a constant rate by the clock mechanism 25 carried by the arm 26.

The arm 32 carries a marker 35 which moves over a chart carried by the cylinder 36, which is revolved at a constant rate by the clock 37.

It will be understood that at zero flow, when the surface of the liquid in the conduit is level with the bottom of the weir, the float positions the cam so that its operative surface of least radius is in contact with the engaging roller, the traction wheel is at the center of the disk so that the registering mechanism is inactive, and the marker is at the datum line of the chart. As the level of the liquid rises and the flow through the weir increases, the corresponding movement of the float turns the cam, which, through the intermediate mechanism, effects the movement of the traction wheel from the center toward the periphery of the disk and the movement of the marker from the datum line over the chart in the direction of the axis of the cylinder, the parts being designed so that the registering mechanism indicates the quantity of liquid which has flowed at the end of a given period of time and the recording mechanism indicates the variations in the flow throughout a given period of time.

Having described my invention, I claim:

1. In a meter, the combination of means comprising a rotary cam operated by changes in head of a flowing fluid, means movable by contact with said cam, and integrating mechanism comprising means supported and controlled by said means second named for indicating the flow due to said head.

2. In a meter, the combination with a fluid conduit having a discharge notch, of a device movable by variations of head of a fluid in said conduit, means comprising a rotary cam operated by said device, means oscillated by the engagement of a device thereof with said cam, and means depending from and movable by said means second named for indicating the flow in said conduit.

3. In a meter, the combination with a fluid container, of a float movable by variations of the level of fluid in said container, means comprising a rotary cam operated by the movements of said float with changes in said level, oscillating means comprising a device operated by contact with said cam, registering mechanism supported and movable by said device, and a constantly revolving device for operating said registering mechanism.

4. In a meter, the combination with a fluid container, of mechanism comprising a cam revolved by variations in the level of fluid in said container, and mechanism comprising an arm rocked by said cam, registering means carried by said arm and recording means carried by said arm.

5. In a meter, the combination with a liquid container having a discharge notch, a standard supported by said container, a cam journaled on said standard, a float in said container, means whereby the movement of said float operates said cam, means comprising an arm pivoted on said standard and movable by said cam, a register depending from and movable by said means last named, and a constantly rotating disk supported by said standard and with which said register contacts.

In testimony whereof I have hereunto set my name this 31st day of August, 1917.

JOHN W. LEDOUX.

Copies of this patent may be obtained for five cents each, by addressing the "Commissioner of Patents, Washington, D. C."